United States Patent [19]
Burkle

[11] 3,885,200
[45] May 20, 1975

[54] MONITORING ARRANGEMENT FOR A BLOWER

[75] Inventor: Peter Burkle, Erlangen, Germany

[73] Assignee: Siemens Aktiengesellschaft, Munich, Germany

[22] Filed: Nov. 26, 1973

[21] Appl. No.: 418,981

[30] Foreign Application Priority Data
Nov. 28, 1972 Germany............ 2258252

[52] U.S. Cl. ............................... 317/40 R
[51] Int. Cl. .................................. H02h 5/04
[58] Field of Search.......... 317/40 R, 132; 337/102, 337/42

[56] References Cited
UNITED STATES PATENTS
3,309,574 3/1967 Colby et al...................... 317/40 R Primary Examiner—L. T. Hix
Attorney, Agent, or Firm—Kenyon & Kenyon Reilly Carr & Chapin

[57] ABSTRACT

A monitoring arrangement for a blower in which a heat sensor is placed in the air stream of the blower along with a current carrying resistor, with the sensor arranged a distance from the resistor so that should cooling of the resistor by the air stream cease, a malfunction will be sensed by the sensor and appropriate action may be taken. Also shown is an additional sensor placed next to the resistor which ensures that the resistor is operating and which will provide an indication if for any reason the temperature close to the resistor is not elevated as it should be.

5 Claims, 1 Drawing Figure

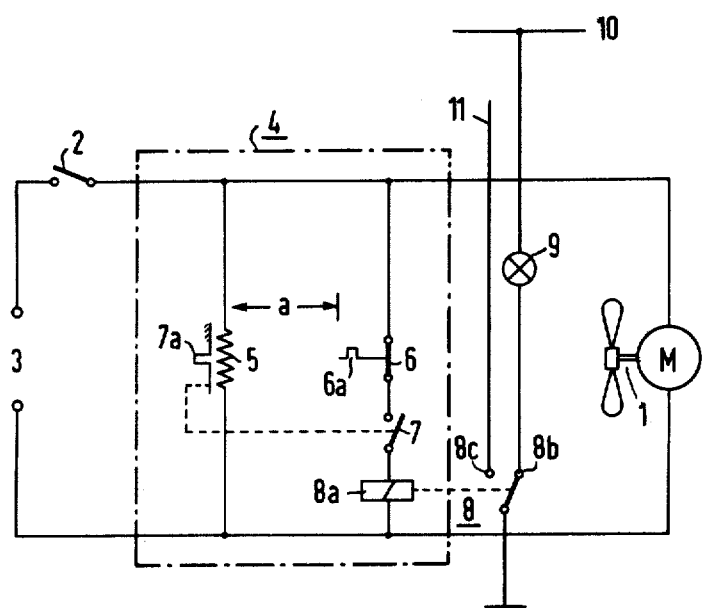

MONITORING ARRANGEMENT FOR A BLOWER

BACKGROUND OF THE INVENTION

This invention relates to monitoring arrangements for blowers and more particularly to such an arrangement which provides for a sensor in the air stream of the blower. As is well known, blowers with or without cooling equipment are used for maintaining a temperature or the cooling of electronic equipment and other types of equipment which are highly sensitive to heat and which develop heat when operating. In such installations, if the blower fails, serious damage may result in the various installed equipments. Thus, in order to avoid such an occurence, monitoring equipment is normally provided to provide an indication of blower inoperativeness.

Typically, this blower monitoring function is performed through the use of an air vane switch with the air vane placed in the air stream of the blower to be monitored. If the blower ceases to operate or the velocity of the air stream drops below a predetermined value, the vane switch closes providing an output indication. Switches of this nature do, however, have a problem in that the air vane can jam mechanically. In such a case, the air vane switch is no longer operable and will not close when the air stream ceases or drops below the predetermined value. Thus, such switches do not provide the necessary reliability in expensive electronic installations. Thus, there is a need for a monitoring arrangement for monitoring blowers of this nature which will function reliably and in a trouble free manner. Such an arrangement such be fail-safe and should not be particularly costly.

SUMMARY OF THE INVENTION

The present invention provides such a monitoring arrangement through the use of a current carrying resistor and a temperature sensor. The current carrying resistor is arranged in the stream of the blower with the temperature sensor arranged in a predetermined distance therefrom. As long as an air flow is maintained, the resistor is cooled and the temperature sensor does not provide an output indicating a high temperature. However, should air flow cease, the temperature sensor will sense the increased resistor temperature and provide an appropriate output. In general terms, the sensor output may be an input to a threshold or comparison stage which will provide an output when the sensed temperature exceeds a predetermined value. In the preferred embodiment, a bi-metallic switch provides both these functions in that it will switch over at the predetermined temperature. Such a design is simple and easily implemented at low cost. Mechanical trouble of the type found in prior art devices cannot occur in such an arrangement. In order to make the arrangement completely fail-safe, an additional temperature sensor is placed in the immediate vicinity of the resistor. Again, in general terms, its output is provided to a threshold or comparison stage. This sensor and its threshold stage are arranged to provide an output if the resistor temperature does not reach or maintain a predetermined value. Thus, in case of resistor failure or an open wire in the circuit, the resistor will not be heated up and a corresponding indication will be given by the sensor arrangement. Again, a bi-metallic switch can be used as both the sensor and threshold stage.

BRIEF DESCRIPTION OF THE DRAWINGS

The single FIGURE is a schematic diagram of a preferred embodiment of the present invention.

DETAILED DESCRIPTION OF THE PREFERRED EMBODIMENT

As illustrated on the FIGURE, a motor 1 having a blower fan coupled thereto is supplied with power from a source 3 through a main switch 2. Coupled across the blower is a resistor 5 which, when switch 2 is closed, will have a voltage applied thereacross and begin to carry current causing the resistor to heat up. The resistor 5 is placed in the air stream of the blower and as long as the blower is properly operating will be kept cooled. Arranged a distance away from the resistor 5 is a temperature sensor 6a and its associated switch 6. In the preferred embodiment, this comprises a bi-metallic switch which is adapted to open if the temperature it senses exceeds a predetermined limit. It should be noted in regard to this sensor and the other sensor to be discussed below that other forms of sensing means can be used. For example, a thermistor circuit coupled to a comparator in well known fashion to be used to provide an output to open a relay contact or semiconductor switch. A second temperature sensor designated by 7a is placed immediately next to the resistor 5. Preferably its bi-metal strip 7a will rest against the surface of the resistor 5 when the switch 7 is in the open condition so that it is in direct thermal contact with resistor 5. The switches 6 and 7 are connected in series and provide voltage to one side of a relay coil 8a which has its other end coupled to the other supply terminal 3. Thus, for the relay coil 8a to be energized, both switch 6 and 7 must be closed. Shown associated with the relay coil 8a is a set of contacts with the normally closed contact designated 8b and the normally closed contact designated 8c. The normally closed contact is connected to a lamp 9 which is connected to a blinking-light source 10, the voltage of which may be switched on at the same time as the closing of switch 2 if desired. Naturally, a separate source may be provided to illuminate and blink light 9. Similarly, other types of warning devices such as horns and the like may be coupled to the normally closed contact 8b in order to provide a warning signal. As shown, the normally opened contact 8c is coupled to a line 11. This line 11 may be used to control the equipment which is being cooled. That is, unless the contact 8c is closed and a corresponding indication given on line 11, this equipment can be disabled from operating.

As shown, the switch 2 is opened and the blower 1 not operating. With the switch open, the resistor 5 is cool and thus the bi-metal 6a will keep the switch 6 closed. However, the bi-metal 7a will not be heated and will maintain the switch 7 in the open condition with relay 8a deenergized and the relay contact 8b closed to the lamp 9. Once switch 2 is closed, the blower will start and current will flow through the resistor 5. As soon as resistor 5 reaches its predetermined temperature, the bi-metal strip 7a will sense that temperature and close the switch 7 energizing relay 8a to close the normally open contact 8c to provide an appropriate signal on line 11 indicating that the equipment may be turned on and that adequate cooling is being provided. As long as operation is normal, the resistor 5 will remain cooled with the air flow carrying off the heat so that sufficient heat radiation will not reach the bi-metal strip 6a to cause switch 6 to open. However, should the blower 1 fail, the radiation from the resistor 5 will act on the bi-metal strip 6a to open switch 6 deenergizing the relay 8a, and causing the normally closed contact 8b to be closed and provide an appropriate indication on the warning light 9. At the same time the opening of the contact 8c will result in the equipment being cooled shutting down.

Should resistor 5 fail or should one of the lines supplying it open up, the resistor will immediately cool down, which cooling will be sensed by the bi-metal strip 7a which will open its switch 7 to similarly deenergize relay coil 8a and provide a warning through lamp 9 and shut down the equipment in response to contact 8c opening. Should a power supply failure occur so that voltage is not applied at the terminals 3, the relay 8a will immediately be deenergized without the opening of either switch resulting in equipment shutdown and a warning.

The physical arrangement of the resistor 5 and sensor 6a can be adjusted depending on the power of the resistor 5 and the type of bi-metallic switch or other sensor used so that the switch 6 will remain closed during normal operating conditions but will receive sufficient radiated heat during abnormal conditions so that it will open.

Thus, an improved simple and inexpensive monitoring circuit for a blower in which a blower malfunction is immediately and efficiently sensed and which includes fail-safe provisions to shutdown the system in case of sensor failure has been shown. Although a specific embodiment of the invention has been illustrated and described, it will be obvious to those skilled in the art that various modifications may be made without departing from the spirit of the invention which is intended to be limited solely by the appended claims.

What is claimed is:

1. A monitoring arrangement for a blower comprising:
   a. a current carrying resistor in parallel with the blower motor and physically arranged in the air stream of the blower;
   b. first means for sensing temperature spaced from said resistor said means including a first switch, said first means adapted to operate said first switch when the temperature exceeds a first predetermined limit;
   c. second means for sensing temperature said means being placed in the immediate vicinity of said resistor and including a second switch adapted to operate if the temperature of said resistor falls below a second predetermined limit; and
   d. indicator means supplied by said first and second switches in series.

2. A monitoring arrangement as in claim 1 wherein said indicator means comprises an indicator relay.

3. The invention according to claim 1 wherein said first means for sensing temperature comprise a first bi-metallic switch.

4. The invention according to claim 1 wherein said first and second means for sensing temperature comprise first and second bi-metallic switches.

5. The invention according to claim 2 and further including indicating means coupled to the contacts of said relay.

* * * * *